Figure 1:
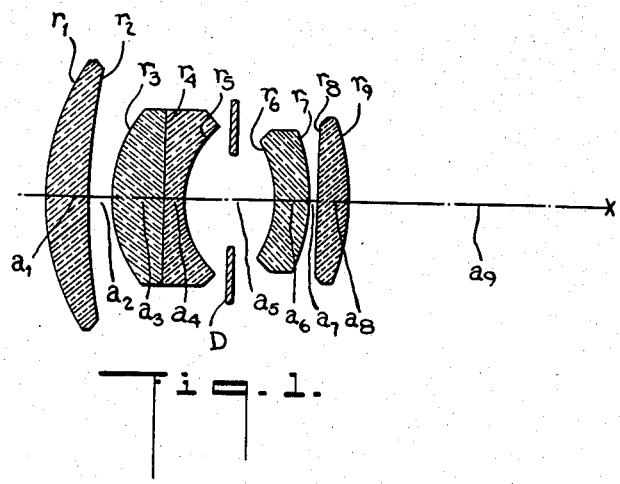

Feb. 5, 1963       W. MANDLER ETAL       3,076,383
HIGH APERTURE OBJECTIVE FOR PHOTOGRAPHY AND PROJECTION
Filed July 26, 1960

INVENTORS
WALTER MANDLER
BY  ERICH WAGNER

AGENT

United States Patent Office 3,076,383
Patented Feb. 5, 1963

3,076,383
HIGH APERTURE OBJECTIVE FOR PHOTOGRAPHY AND PROJECTION
Walter Mandler and Erich Wagner, Midland, Ontario, Canada, assignors to Ernst Leitz G.m.b.H., Optische Werke, Wetzlar, Germany, a corporation of Germany
Filed July 26, 1960, Ser. No. 45,351
Claims priority, application Germany July 29, 1959
2 Claims. (Cl. 88—57)

The present invention relates to a high aperture objective for photography and projection (high power objective) which is of the Gauss type and is corrected for spherical aberration, coma, astigmatism, distortion, and chromatic aberrations. Seen in the direction of the incidence of light, the objective comprises, on one side of the diaphragm, a first positive lens and a cemented meniscus lens component with a concave surface facing the diaphragm, and, on the other side of the diaphragm, a single meniscus lens with a concave surface facing the diaphragm and a second positive lens.

While objectives of this construction are known, their maximum relative aperture is 1:2.8 since the lens radii in these known objectives are not large enough to permit a larger relative aperture with sufficiently small zones. While one known type of objective with this construction may also be used for a relative aperture of 1:2, it has a relatively large zonal aberration. Furthermore, the distance of the last lens of this objective from the image-receiving plane is so small that it had to be limited for mechanical reasons to long focal lengths.

It is the primary object of the present invention to improve this latter type of high power objective so as to reduce its zonal aberration while increasing the distance of the last lens to the image-receiving plane.

In an objective of the indicated construction, this object is accomplished in accordance with this invention when the sum of the absolute values of the outer radii of the positive lenses is at least equal to the focal length of the objective and the difference between said absolute values is no more than 10% of said focal length, if the sum of the absolute values of the outer radii of the meniscus lenses is at least 70% of said focal length and the difference between the latter absolute values is no more than 10% of said focal length, if the sum of the absolute values of the radii of the concave surfaces of the meniscus lenses is at least 45% of said focal length and the dfference between the last-mentioned absolute values is no more than 10% of said focal length, and if light rays entering the objective parallel to the optical axis penetrate the objective lenses following the diaphragm at heights which are between 0.5 and 0.6 of their respective heights on the first surface of the objective.

Preferably, the sum of the absolute values of the outer radii of the meniscus lenses should not exceed about 200% of the focal length and the sum of the absolute values of the radii of the concave surfaces of the meniscus lenses should not exceed about 100% of the focal length.

Throughout the specification and claims, the term "outer radii" refers to the radii of the lenses facing away from the objective diaphragm while the "inner radii" are those which face the diaphragm.

Figure 2:
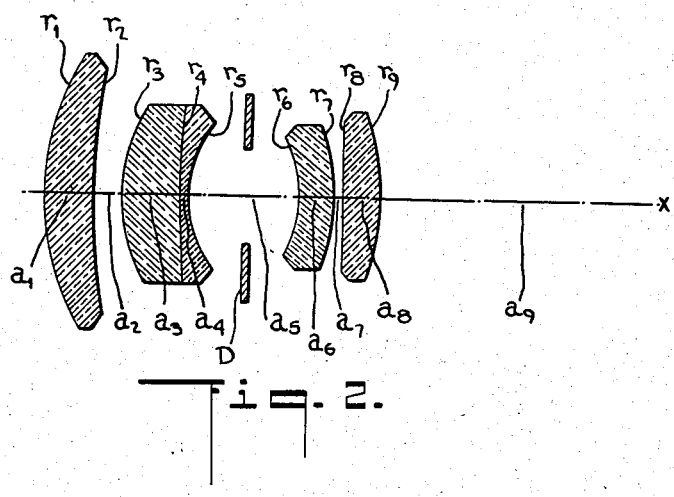

The invention will be examplified in connection with two specific embodiments of high aperture objectives as schematically illustrated in FIGS. 1 and 2 of the accompanying drawing.

The following Tables 1 and 2 correspond to the embodiments of FIGS. 1 and 2 respectively, wherein $r_1$ and $r_9$ are the outer radii of the first and second positive lenses, respectively, $r_3$ and $r_7$ are the outer radii of the respective meniscus lenses, $r_5$ and $r_6$ are the respective radii of the concave surfaces of the meniscus lenses, $r_2$ and $r_8$ are the inner radii of the first and second positive lenses, $r_4$ is the radius of the cementing surface between the lenses forming the cemented meniscus lens; $a_1$, $a_3$, $a_4$, $a_6$, and $a_8$ are, respectively, the thicknesses of the first positive lens, two lenses forming the cemented meniscus lens component, the single meniscus lens and the second positive lens; $a_2$, $a_5$, and $a_7$ are, respectively, the distances between the first positive lens and the cemented meniscus lens component, the cemented meniscus lens component and the single meniscus lens, and the single meniscus lens and the second positive lens; $a_9$, is the distance of the second positive lens from an image-receiving plane; $n_e$ is the index of refraction for the $e$-line, and $v_e$ is the coefficient of dispersion.

D is the diaphragm of the objective.

The indicated values for $r$ and $a$ are given in relation to the focal length so that a value of 0.0931, for instance, means that the distance between two lens surfaces is 0.0931 of the focal length.

Table 1
[Focal length $f$=1.00. Angle of image: 27°. Relative aperture 1:2.5]

| $r$ | $a$ | $n_e$ | $v_e$ |
|---|---|---|---|
| $r_1$=+0.604 | | | |
| | $a_1$=0.0931 | 1.658 | 50.8 |
| $r_2$=+1.643 | | | |
| | $a_2$=0.0521 | | |
| $r_3$=+0.3211 | | | |
| | $a_3$=0.1118 | 1.658 | 50.8 |
| $r_4$=∞ | | | |
| | $a_4$=0.0480 | 1.673 | 32.2 |
| $r_5$=+0.219 | | | |
| | $a_5$=0.1934 | | |
| $r_6$=−0.2739 | | | |
| | $a_6$=0.0783 | 1.755 | 27.5 |
| $r_7$=−0.4078 | | | |
| | $a_7$=0.0094 | | |
| $r_8$=+2.267 | | | |
| | $a_8$=0.0699 | 1.639 | 55.5 |
| $r_9$=−0.524 | | | |
| | $a_9$=0.5790 | | |

Table 2
[Focal length=1.00. Angle of image: 45°. Relative aperture 1:2.0]

| $r$ | $a$ | $n_e$ | $v_e$ |
|---|---|---|---|
| $r_1$=+0.5379 | | | |
| | $a_1$=0.0948 | 1.744 | 44.9 |
| $r_2$=+1.1950 | | | |
| | $a_2$=0.0577 | | |
| $r_3$=+0.3269 | | | |
| | $a_3$=0.1138 | 1.717 | 47.9 |
| $r_4$=+1.9231 | | | |
| | $a_4$=0.0173 | 1.728 | 28.7 |
| $r_5$=+0.2263 | | | |
| | $a_5$=0.2212 | | |
| $r_6$=−0.2665 | | | |
| | $a_6$=0.0673 | 1.755 | 27.5 |
| $r_7$=−0.3913 | | | |
| | $a_7$=0.0192 | | |
| $r_8$=+7.6923 | | | |
| | $a_8$=0.0712 | 1.713 | 53.9 |
| $r_9$=−0.5150 | | | |
| | $a_9$=0.5635 | | |

While specific examples of high aperture objectives have been set forth for purposes of illustration, it should be clearly understood that any variations and modifications may occur to the skilled in the art, particularly after benefiting from the present teaching, without departing from the spirit and scope of the invention as defined in the appended claims.

We claim:

1. A high aperture objective for photography and image projection of the Gauss type, said objective having a diaphragm and comprising, in the direction of the incidence of light, a first positive lens and a cemented meniscus lens component between the first positive lens and the diaphragm, said cemented meniscus lens component having a concave surface facing the diaphragm; and a single meniscus lens also having a concave surface facing the diaphragm and a second positive lens, the single meniscus lens being positioned between the diaphragm and the second positive lens, the sum of the absolute values of the outer radii of the positive lenses being at least equal to the focal length of the objective and the difference between said absolute values being no more than 10% of said focal length, the sum of the absolute values of the outer radii of the meniscus lens component and the single meniscus lens being at least 70% of said focal length and the difference between the latter absolute values being no more than 10% of said focal length, the sum of the absolute values of the radii of the concave surfaces of the meniscus lens component and the single meniscus lens being at least 45% of said focal length and the difference between the last-mentioned absolute values being no more than 10% of said focal length, and that light rays entering the objective parallel to the optical axis penetrate the concave surface of the single meniscus lens at heights which are between 0.5 and 0.6 of their respective heights on the first surface of the objective; the objective being characterized by the following data in reference to the $e$-line:

[Focal length=1.00. Field angle=27°. Relative aperture=1:2.5]

| $r$ | $a$ | $n_e$ | $v_e$ |
|---|---|---|---|
| $r_1=+0.604$ | $a_1=0.0931$ | 1.658 | 50.8 |
| $r_2=+1.643$ | $a_2=0.0521$ | | |
| $r_3=+0.3211$ | $a_3=0.1118$ | 1.658 | 50.8 |
| $r_4=\infty$ | $a_4=0.0480$ | 1.673 | 32.2 |
| $r_5=+0.219$ | $a_5=0.1934$ | | |
| $r_6=-0.2739$ | $a_6=0.0783$ | 1.755 | 27.5 |
| $r_7=-0.4078$ | $a_7=0.0094$ | | |
| $r_8=+2.267$ | $a_8=0.0699$ | 1.639 | 55.5 |
| $r_9=-0.524$ | $a_9=0.5790$ | | | wherein $r_1$ and $r_9$ are the outer radii of the first and second positive lenses, respectively, $r_3$ and $r_7$ are the outer radii of the respective meniscus lenses, $r_5$ and $r_6$ are the respective radii of the concave surfaces of the meniscus lenses, $r_2$ and $r_8$ are the inner radii of the first and second positive lenses, $r_4$ is the radius of the cementing plane between the lenses forming the cemented meniscus lens component; $a_1$, $a_3$, $a_4$, $a_6$, and $a_8$ are, respectively, the thicknesses of the first positive lens, two lenses forming the cemented meniscus lens component, the single meniscus lens, and the second positive lens; $a_2$, $a_5$, and $a_7$ are, respectively, the distances between the first positive lens and the cemented meniscus lens component, the cemented meniscus lens component and the single meniscus lens, and the single meniscus lens and the second positive lens; $a_9$ is the distance of the second positive lens from an image-receiving plane; $n_e$ is the index of refraction, and $v_e$ is the coefficient of dispersion.

2. A high aperture objective for photography and image projection of the Gauss type, said objective having a diaphragm and comprising, in the direction of the incidence of light, a first positive lens and a cemented meniscus lens component between the first positive lens and the diaphragm, said cemented meniscus lens component having a concave surface facing the diaphragm; and a single meniscus lens also having a concave surface facing the diaphragm and a second positive lens, the single meniscus lens being positioned between the diaphragm and the second positive lens, the sum of the absolute values of the outer radii of the positive lenses being at least equal to the focal length of the objective and the difference between said absolute values being no more than 10% of said focal length, the sum of the absolute values of the outer radii of the meniscus lens component and the single meniscus lens being at least 70% of said focal length and the difference between the latter absolute values being no more than 10% of said focal length, the sum of the absolute values of the radii of the concave surfaces of the meniscus lens component and the single meniscus lens being at least 45% of said focal length and the difference between the last mentioned absolute values being no more than 10% of said focal length, and that light rays entering the objective parallel to the optical axis penetrate the concave surface of the single meniscus lens at heights which are between 0.5 and 0.6 of their respective heights on the first surface of the objective, the objective being characterized by the following data in reference to the $e$-line:

[Focal length=1.00. Field angle=45°. Relative aperture 1:2.0]

| $r$ | $a$ | $n_e$ | $v_e$ |
|---|---|---|---|
| $r_1=+0.5379$ | $a_1=0.0948$ | 1.744 | 44.9 |
| $r_2=+1.1950$ | $a_2=0.0577$ | | |
| $r_3=+0.3269$ | $a_3=0.1138$ | 1.717 | 47.9 |
| $r_4=+1.9231$ | $a_4=0.0173$ | 1.728 | 28.7 |
| $r_5=+0.2263$ | $a_5=0.2212$ | | |
| $r_6=-0.2665$ | $a_6=0.0673$ | 1.755 | 27.5 |
| $r_7=-0.3913$ | $a_7=0.0192$ | | |
| $r_8=+7.6923$ | $a_8=0.0712$ | 1.713 | 53.9 |
| $r_9=-0.5150$ | $a_9=0.5635$ | | | wherein $r_1$ and $r_9$ are the outer radii of the first and second positive lenses, respectively, $r_3$ and $r_7$ are the outer radii of the respective meniscus lenses, $r_5$ and $r_6$ are the respective radii of the concave surfaces of the meniscus lenses, $r_2$ and $r_8$ are the inner radii of the first and second positive lenses, $r_4$ is the radius of the cementing plane between the lenses forming the cemented meniscus lens component; $a_1$, $a_3$, $a_4$, $a_6$, and $a_8$ are, respectively, the thicknesses of the first positive lens, two lenses forming the cemented meniscus lens component, the single meniscus lens, and the second positive lens; $a_2$, $a_5$, and $a_7$ are, respectively, the distances between the first positive lens and the cemented meniscus lens component, the cemented meniscus lens component and the single meniscus lens, and the single meniscus lens and the second positive lens; $a_9$ is the distance of the second positive lens from an image-receiving plane; $n_e$ is the index of refraction, and $v_e$ is the coefficient of dispersion.

References Cited in the file of this patent
UNITED STATES PATENTS
2,818,776   Hayes et al. _____ Jan. 7, 1958